UNITED STATES PATENT OFFICE.

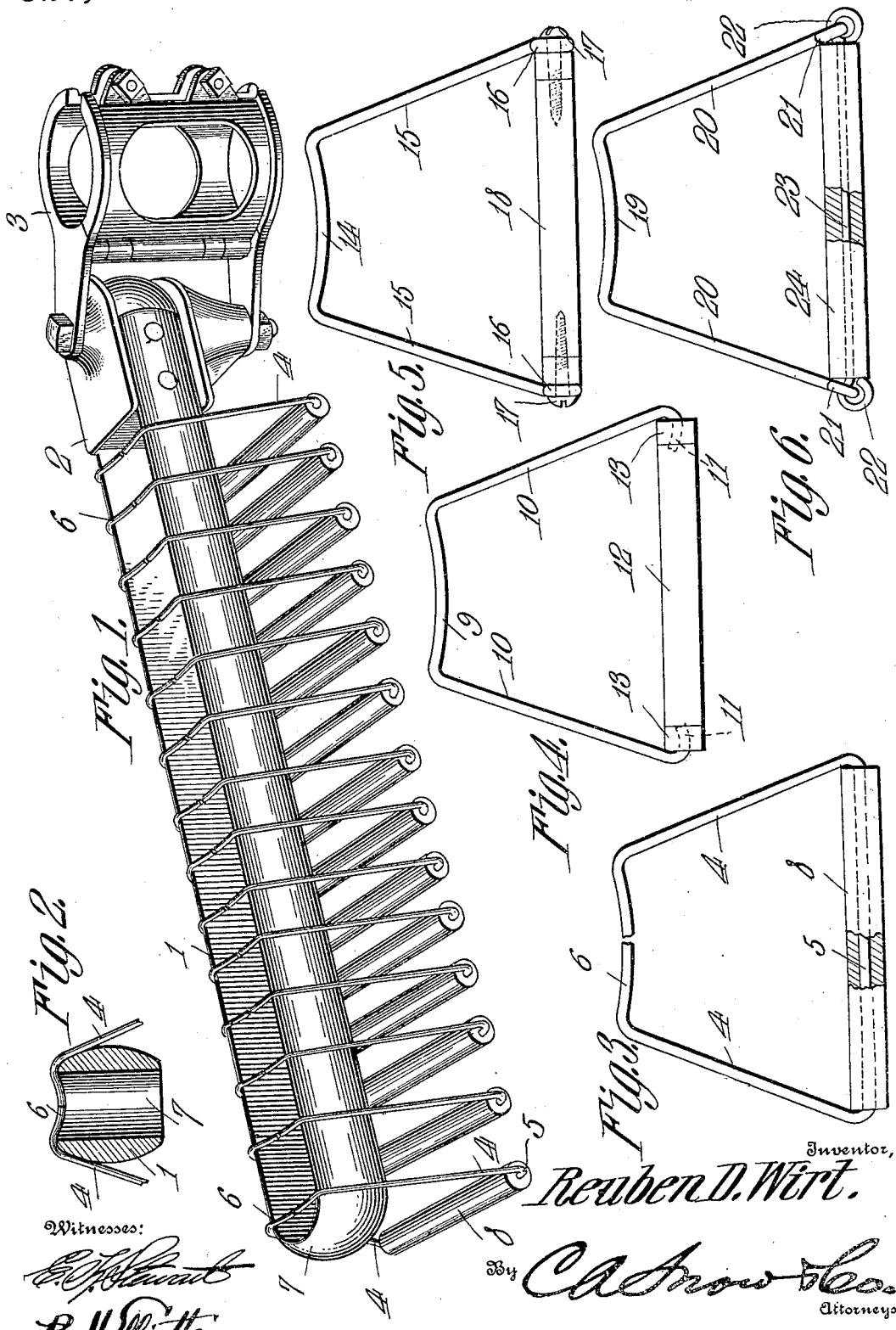

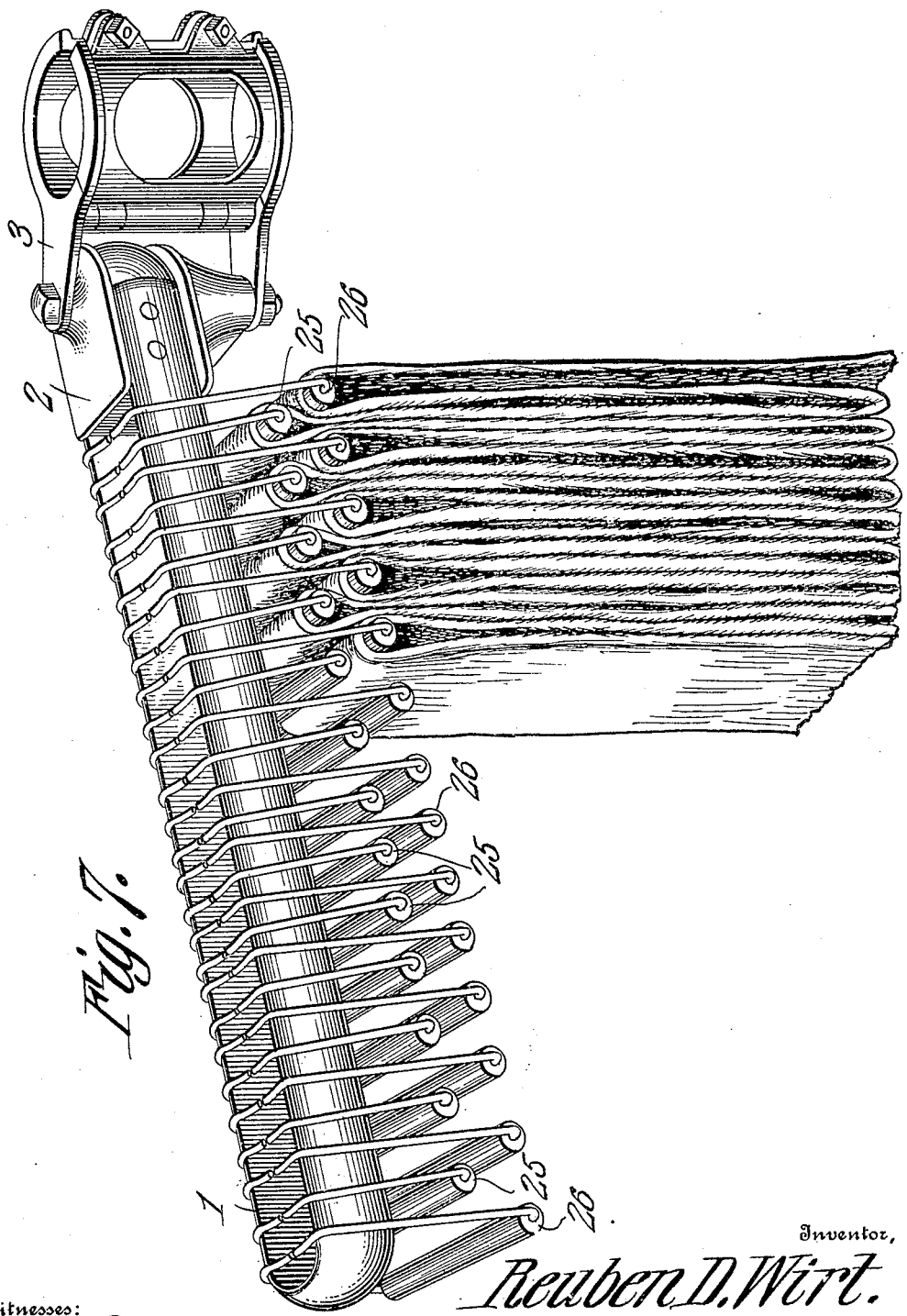

REUBEN D. WIRT, OF PHILADELPHIA, PENNSYLVANIA.

HOSE-RACK.

No. 927,624.

Specification of Letters Patent.

Patented July 13, 1909.

Application filed February 18, 1909. Serial No. 478,602.

*To all whom it may concern:*

Be it known that I, REUBEN D. WIRT, a citizen of the United States, residing at Philadelphia, in the county of Philadelphia and State of Pennsylvania, have invented a new and useful Hose-Rack, of which the following is a specification.

This invention relates generally to hose racks, and particularly to that class employing hose suspenders that are strung upon the hose and are detached from the rack arms when the hose is withdrawn for use.

The objects of the invention are in a ready and practical manner, to improve, strengthen, and simplify the construction of the rack arm by reducing the number of its parts to the minimum, and thus proportionately to lessen the cost of its production, and to construct the hose suspenders in such manner that their connection with the hose will be facilitated and their accidental disconnection from the rack arm will be prevented without interfering with their free detachment when the hose is withdrawn in use. Furthermore, without increasing the length of the rack arm, practically to double its hose-carrying capacity, With the above and other objects in view, as will appear as the nature of the invention is better understood, the same consists, generally stated, in a rack comprising an approximately U-shaped arm, and a plurality of hose suspenders designed to be strung upon a hose, each having a part to engage with the crest or bend of the arm to hold the suspenders against accidental detachment from the arm. The arm may be constructed from a length of metal bent to the shape defined, or may be of cast metal, and its free ends are rigidly secured to a head, which in turn is pivotally connected to a suitable attachment to secure the rack to a convenient support, such as a stand-pipe or a wall. The suspenders are preferably constructed of heavy resilient wire, bent to the approximate shape to be placed on the rack arm and to be strung on a hose, that portion of the suspenders around which the hose is looped being constructed of non-oxidizable material to protect it from rust. As a means for preventing the suspenders from becoming accidentally detached from the arm, that portion of each that rests upon the upper side of the arm is bowed or curved downward, this to lie within the plane of the upper edges of the arm members and to contact with the crest or bend of the arm, and thus secure the object sought.

As a matter of further and specific improvement, the hose suspenders are made in two lengths and arranged alternately on the rack arm, the rungs of the shorter suspenders being spaced at such distances from those of the longer suspenders as to enable both series of rungs to support the hose without interference with each other.

Further and more specific details of construction will hereinafter more fully appear.

In the accompanying drawings forming a part of this specification, and in which like characters of reference indicate corresponding parts:—Figure 1 is a view in perspective of a hose rack constructed in accordance with the present invention. Fig. 2 is a vertical transverse sectional view through the rack arm. Figs. 3, 4, 5 and 6 are detail views of different forms of suspenders that may be employed. Fig. 7 is a perspective detail view of a modified form of rack.

The rack comprises an arm 1, which is constructed from a length of metal, approximately semi-circular in cross section, and bent to U-shape, the free ends of the arm thus pivoted being riveted to a head 2, which in turn is pivotally connected with a pipe clamp 3, by which the rack may be connected with a stand pipe. If preferred, instead of the pipe clamp, a bracket may be employed by which the arm may be attached to a wall or other appropriate support.

While it will generally be advantageous to construct the arm of wrought metal, yet if preferred it may be cast, and as this will be readily understood, detailed illustration in any modified form is omitted.

Disposed upon the arm is a series of hose suspenders, each of which is constructed of a length of heavy gage resilient wire, bent to form two oppositely inclined side members 4, a bottom member 5, and a top member 6.

The form of suspender just described is that shown in detail in Fig. 3 and as applied to the hose rack shown in Fig. 1, the other forms being described farther on. As shown, the bottom member 5 is in one piece, while the top member 6 is in two pieces, and these two latter members are inwardly or downwardly bowed, so that when combined with the rack arm, they will extend below the plane of the upper edges of the arms thereof, and thus present stops which will, by engagement with the crest or bend 7 of the arm, serve to prevent accidental disconnection of the suspenders from the arm. The object for splitting the member 6 is to permit of the side members being spread apart when the suspenders are to be strung upon a hose, in a manner as will readily be understood. In order to prevent any oxidation which would tend to rust the hose, each lower arm has combined with it a cylindrical rung 8 of non-oxidizable material, say, of wood, which may or may not be revoluble relatively to the member. The rungs 8 will be of such size as effectually to prevent any sharp kinking of the hose which might be injurious in time.

As shown in Fig. 4, the top and side members 9 and 10 of the suspender are made in one piece, and the lower ends of the latter members are inturned and slightly curved to provide pintles 11, that are designed to engage orifices or sockets in the ends of the rung 12. As shown, this rung is provided with ferrules 13, but these are not essential, and may be omitted if preferred.

In the form of the invention shown in Fig. 5, the top and side members 14 and 15 of the suspender are in one piece, and the lower ends of the latter are formed into eyes 16, through which pass screws 17 that are seated in the ends of the rung 18.

In the form of the invention shown in Fig. 6, the top and side members 19 and 20 are also of one piece, and the lower ends of the latter are formed into eyes 21, which are designed to engage with eyes 22, formed on the ends of the lower member 23, the latter being extended at both ends beyond the rung 24, as clearly shown.

In the form of the invention shown in Fig. 7, two series of hose rungs are employed in order practically to double the carrying capacity of the rack without increasing its length. The longer series 25 is of the same character as that shown in Fig. 1, while the shorter series 26 is spaced a sufficient distance from that first named to prevent any interference between the bends of the hose on the two series of rungs.

In each form of the invention it will be observed that the top member of the suspenders is downwardly bowed or curved in the manner described in connection with Fig. 1, so that each will secure the function of preventing accidental disconnection of the suspender from the rack arm. This is of importance, inasmuch as their absence would result in dispensing with any means whatever for holding the suspender properly assembled with the arm. As will be obvious, these stops 6, 9, 14 and 19 formed by the top members will not interfere with the withdrawal of the members from the arm, but, as stated, are merely to prevent accidental disconnection of the parts.

I claim:—

1. A hose rack comprising a supporting member, and a hose suspender slidably mounted upon said member, and having a depressed portion projecting into the supporting member and movable against a portion thereof to hold the suspender against accidental disconnection from the supporting member.

2. A hose rack comprising a supporting member, and a hose suspender having a depressed portion to engage one end of said member.

3. A hose rack comprising an approximately U-shaped arm, and a hose suspender having a curved part to engage the bend of the arm.

4. A hose rack comprising an approximately U-shaped arm, and a hose suspender having a pair of curved inturned members to engage with the crest of the arm.

5. A hose rack comprising an approximately U-shaped arm, and a hose suspender having a pair of down-curved members to engage with the bend of the arm.

6. A hose rack comprising an approximately U-shaped arm, and a hose suspender having a pair of down-curved oppositely alined members to engage with the bend of the arm.

7. A hose rack comprising an approximately U-shaped arm, and a hose suspender having that portion engaging with the upper side of the arm disposed within the plane of the upper end thereof, thereby to provide a stop to engage with the crest of the arm and thus hold the parts assembled.

In testimony that I claim the foregoing as my own, I have hereto affixed my signature in the presence of two witnesses.

REUBEN D. WIRT

Witnesses:
E. HUME TALBERT,
E. DANIELS.